(12) United States Patent
Zhou

(10) Patent No.: US 11,032,510 B2
(45) Date of Patent: Jun. 8, 2021

(54) VIDEO PROCESSING METHOD, COMPUTER DEVICE, AND STORAGE MEDIUM

(71) Applicant: TENCENT TECHNOLOGY (SHENZHEN) COMPANY LIMITED, Shenzhen (CN)

(72) Inventor: Yang Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/590,460

(22) Filed: Oct. 2, 2019

(65) Prior Publication Data

US 2020/0036937 A1 Jan. 30, 2020

Related U.S. Application Data

(63) Continuation of application No. PCT/CN2018/111971, filed on Oct. 25, 2018.

(30) Foreign Application Priority Data

Oct. 27, 2017 (CN) .......................... 201711021898.0

(51) Int. Cl.
| | | |
|---|---|---|
| *H04N 13/15* | (2018.01) | |
| *H04N 13/167* | (2018.01) | |
| *H04N 13/376* | (2018.01) | |
| *H04N 13/383* | (2018.01) | |
| *H04N 13/133* | (2018.01) | |

(Continued)

(52) U.S. Cl.
CPC ......... *H04N 7/0137* (2013.01); *H04N 13/133* (2018.05); *H04N 13/15* (2018.05);
(Continued)

(58) Field of Classification Search
CPC .... H04N 7/0137; H04N 13/15; H04N 13/167; H04N 13/376; H04N 13/383;
(Continued)

(56) References Cited

U.S. PATENT DOCUMENTS

| 9,473,758 B1 | 10/2016 | Long et al. |
| 2008/0291326 A1 | 11/2008 | Shishido et al. |

(Continued)

FOREIGN PATENT DOCUMENTS

| CN | 1551637 A | 12/2004 |
| CN | 101573972 A | 11/2009 |

(Continued)

OTHER PUBLICATIONS

International Search Report dated Jan. 16, 2019 in PCT/CN2018/111971 filed Oct. 25, 2018. (With English Translation).
(Continued)

*Primary Examiner* — Jared Walker
(74) *Attorney, Agent, or Firm* — Oblon, McClelland, Maier & Neustadt, L.L.P.

(57) ABSTRACT

A video processing method is provided. In the method, circuitry of a terminal determines a second video frame portion associated with a second time point that is after a first time point associated with a first video frame portion of a video. The circuitry generates a transitional video frame based on the first video frame portion and the second video frame portion. A color value of a pixel at a target pixel location in the transitional video frame is within a target color interval. The target color interval is determined according to a color value of a pixel at the target pixel location in the first video frame portion and a color value of a pixel at the target pixel location in the second video frame portion. The circuitry performs display control of the video according to the transitional video frame.

20 Claims, 8 Drawing Sheets

(51) Int. Cl.
*H04N 13/373* (2018.01)
*H04N 13/398* (2018.01)
*H04N 7/01* (2006.01)

(52) U.S. Cl.
CPC ......... *H04N 13/167* (2018.05); *H04N 13/373* (2018.05); *H04N 13/376* (2018.05); *H04N 13/383* (2018.05); *H04N 13/398* (2018.05)

(58) Field of Classification Search
CPC .. H04N 13/133; H04N 13/373; H04N 13/398; H04N 13/122; H04N 13/324; H04N 13/344; H04N 19/597; H04N 21/44218; H04N 21/816; H04N 21/6587; H04N 21/44008; H04N 21/440245; H04N 9/64; G06F 3/013; G06F 3/012; G02B 2027/014; G02B 27/0093; G09G 2320/0666; G09G 2340/16; G09G 5/026
See application file for complete search history.

(56) References Cited

U.S. PATENT DOCUMENTS

| | | | | |
|---|---|---|---|---|
| 2013/0315505 | A1* | 11/2013 | Atkins | G06T 3/4007 382/300 |
| 2014/0268356 | A1* | 9/2014 | Bolas | G02B 27/017 359/630 |
| 2016/0183020 | A1* | 6/2016 | Gatien | H04R 29/00 381/56 |
| 2017/0148179 | A1* | 5/2017 | Holzer | G06F 16/5838 |
| 2017/0148222 | A1* | 5/2017 | Holzer | H04N 19/124 375/240.15 |
| 2018/0091768 | A1* | 3/2018 | Adsumilli | H04N 7/0127 |
| 2018/0158246 | A1* | 6/2018 | Grau | G02B 27/0093 |

FOREIGN PATENT DOCUMENTS

| | | |
|---|---|---|
| CN | 102932580 | 2/2013 |
| CN | 105184738 | 12/2015 |
| CN | 105898138 A | 8/2016 |
| CN | 106375748 | 2/2017 |

OTHER PUBLICATIONS

Written Opinion dated Jan. 16, 2019 in PCT/CN2018/111971 filed Oct. 25, 2018.
Chinese Office Action Issued in Application CN201711021898.0 dated Aug. 28, 2020, with concise English translation (8 pages).

* cited by examiner

VIDEO PROCESSING METHOD, COMPUTER DEVICE, AND STORAGE MEDIUM

RELATED APPLICATION

This application is a continuation of International Application No. PCT/CN2018/111971, filed on Oct. 25, 2018, which claims priority to Chinese Patent Application No. 201711021898.0, entitled "VIDEO PROCESSING METHOD AND APPARATUS, INTELLIGENT TERMINAL, AND STORAGE MEDIUM" filed on Oct. 27, 2017. The entire disclosures of the prior applications are hereby incorporated by reference in their entirety.

FIELD OF THE TECHNOLOGY

This application relates to the field of video technologies.

BACKGROUND OF THE DISCLOSURE

A panoramic video is a video that can be obtained by all-round photographing according to requirements, or a video obtained by image making, and can present video content in 360 degrees. When watching a panoramic video, a user may freely perform upward, downward, leftward, and rightward play control on the panoramic video according to requirements. Panoramic videos are mostly applied to scenarios such as tourism exhibition, venues, or city introduction.

A virtual reality (VR) device is one device that can play a panoramic video. The VR device may be worn on a user's head, and the user may directly rotate the head to implement upward, downward, leftward, and rightward play control on the panoramic video, to watch image content desired by the user.

How to perform play control on the panoramic video to meet requirements of the user has become a hotspot of study.

SUMMARY

According to various embodiments provided in this application, a video processing method, a computer device, and a non-transitory computer-readable storage medium are provided. According to an aspect, a video processing method is provided. In the method, circuitry of a terminal determines a second video frame portion associated with a second time point that is after a first time point associated with a first video frame portion of a video. A transitional video frame is generated by the circuitry based on the first video frame portion and the second video frame portion. A color value of a pixel at a target pixel location in the transitional video frame is within a target color interval. The target color interval is determined according to a color value of a pixel at the target pixel location in the first video frame portion and a color value of a pixel at the target pixel location in the second video frame portion;. Display control of the video is performed by the circuitry according to the transitional video frame.

According to an aspect, motion speed information is obtained by the circuitry. Second pose information of the second time point is obtained by the circuitry according to first pose information of the first time point, the motion speed information, and a difference between the first time point and the second time point. A second video frame of the video to be displayed at the second time point is obtained by the circuitry. The second video frame portion is obtained by the circuitry from the second video frame according to the second pose information.

According to an aspect, a width of the second video frame portion obtained from the second video frame is greater than a width of a video image that is displayed. The displayed video image is a partial image of the second video frame.

According to an aspect, a height of the second video frame portion obtained from the second video frame is greater than a height of the displayed video image.

According to an aspect, the motion speed information indicates rotation angular velocity values in at least two different motion directions. The second pose information is visual field orientation angle information. A plurality of different motion directions is associated with initial video frame groups, and each initial video frame group includes a candidate second video frame portion and a candidate transitional video frame generated based on the second video frame portion.

According to an aspect, a video frame refresh frequency of the terminal is obtained by the circuitry. A video frame play frequency during playing of the video is obtained by the circuitry. A number of transitional video frames is obtained by the circuitry according to the video frame refresh frequency and the video frame play frequency. The determined number of transitional video frames are generated.

According to an aspect, a first color value of the pixel of the target pixel location in the first video frame portion is obtained by the circuitry. A second color value of the pixel of the target pixel location in the second video frame portion is obtained by the circuitry. The color value of the transitional pixel at the target pixel location is obtained by the circuitry based on an interpolation according to the first color value and the second color value;. The transitional video frame is generated by the circuitry according to pixel values of a plurality of transitional pixels, which includes the transitional pixel.

According to an aspect, differential calculation is performed by the circuitry between color channel components in the first color value and color channel components in the second color value, to obtain component differences of the color channel components. Change amounts of the color channel components are obtained by the circuitry according to a number of transitional video frames that need to be generated. The color value of the transitional pixel of the target pixel location of each of the number of transitional video frames is obtained by the circuitry according to the color channel components of the first color value, the number of the transitional video frames that need to be generated, and the change amounts of the color channel components.

According to an aspect, the transitional video frame is generated based on all pixels of the first video frame portion and all pixels of the second video frame portion.

According to an aspect, the color value of the pixel at the target pixel location in the first video frame portion is one of black and white, and the color value of the pixel at the target pixel location in the second video frame portion is the other one of black and white.

According to an aspect, a motion direction is detected by the circuitry. An initial video frame group associated with the motion direction is selected by the circuitry, to obtain a target initial video frame group. The display control of the video is performed by the circuitry according to the target initial video frame group.

According to an aspect, a visual field angle parameter of the terminal is obtained by the circuitry. A pixel range to be display is determined by the circuitry according to the visual field angle parameter. Pixel coordinate matching is performed by the circuitry on each video frame portion in the target initial video frame group according to the pixel range, to form a transitional play video frame and a second play video frame. The transitional play video frame and the second play video frame are sequentially played by the circuitry.

At least one non-transitory computer-readable storage medium storing instructions which when executed by one or more processors cause the one or more processors to perform any of the image processing methods.

DESCRIPTION OF EMBODIMENTS

To make the objectives, the technical solutions, and the advantages of this application clearer, the following further describes this application in detail with reference to the accompanying drawings and the embodiments. It should be understood that the specific embodiments described herein are only used to describe this application, instead of limiting this application.

Figure 1A:
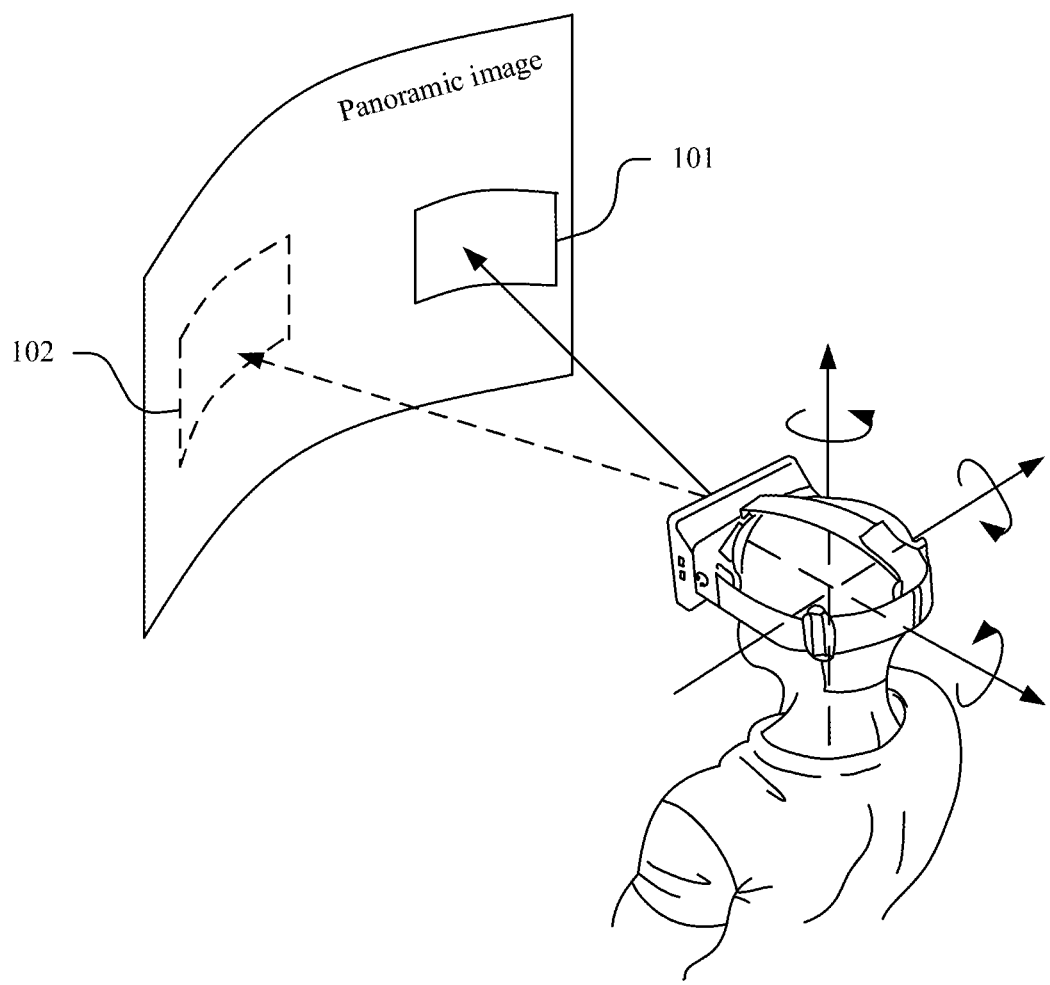
FIG. 1a is a schematic diagram of a scenario of playing a panoramic video according to an embodiment of this application.

In an embodiment of this application, when a panoramic video (e.g., a partially or fully immersive video) is played, play control may be performed in a plurality of motion directions according to requirements, so that a video frame that can be played and displayed to a user can be obtained through adjustment in a panoramic video frame. The panoramic video may be played by using a VR device. When the panoramic video is played by using the VR device, the user may rotate a head in up, down, left, and right directions, to watch video images at different locations. As shown in FIG. 1a, an image corresponding to an image area 101 is displayed on a display interface in a first visual field orientation angle, and an image corresponding to an image area 102 is displayed on a display interface in a second visual field orientation angle. In other embodiments, the panoramic video may also be played by using a dedicated panoramic video playing device. A description is made by using a VR device as an example.

In a process in which the user wears the VR device to play the panoramic video, almost all light sources are emitted by the VR device. The brightness change may cause a problem of uncomfortable watching. In this embodiment of this application, play control may be performed on the panoramic video according to brightness of an image in a played video frame, and after the control, a degree of the brightness change between video frames played to the user is reduced. When watching the panoramic video played by the VR device, two eyes of a person are fully immersed in a playing environment of the panoramic video. When the panoramic video frame is played in the VR device, brightness of emitted light may fiercely change, or brightness of a part of an area in a large-area block in the panoramic video frame is relatively high. In the cases, the foregoing problem of uncomfortable watching caused by the brightness change may occur.

In this embodiment of this application, to control playing of the panoramic video, interpolation correction is mainly performed on a pixel in a corresponding location area in a panoramic video frame that may be played, so that brightness of a video pixel seen by the user can perform gradient transition, and there is the maximum amount of time to make eyeballs adapted, to further reduce stimulation of the VR device on eyes of the user. In an embodiment, a watching location of the user may be predicted. For example, a visual field orientation angle after the user rotates the head is predicted, and play control is performed on the panoramic video according to the predicted watching location. In an embodiment, a prediction process mainly includes: directly predicting watching locations in 5 directions within a next unit of time, for example, 1/30 second, of a user when the user moves upward, downward, leftward, rightward, or keeps the head still. Then video frame processing is performed on the panoramic video according to the prediction result and the panoramic video frame to be displayed to the user in the next unit of time. The video frame processing includes processing on a transitional initial video frame.

Figure 1B:
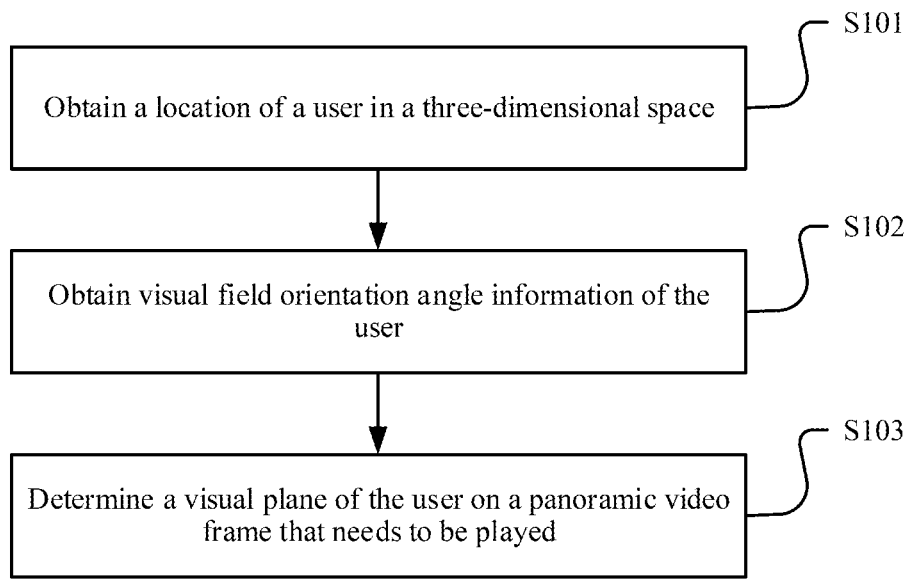
FIG. 1b is a schematic flowchart of determining a visual plane in a panoramic video according to an embodiment of this application.

As shown in FIG. 1b, to display images of an image area 101 and an image area 102 of a panoramic image on a display interface, a location (x,y,z) of the user in a three-dimensional space needs to be obtained in S101, and visual field orientation angle information ($\alpha, \beta, \gamma$) of the user is obtained in S102. ($\alpha, \beta, \gamma$) is a coordinate point under a spherical coordinate, $\gamma$ may be 1, and different visual field orientations are determined based on different $\alpha$ and $\beta$. In this embodiment of this application, the panoramic video is played by using the VR device. The VR device includes a head mounted display (HMD) apparatus. A screen in the HMD apparatus is used to provide a display interface to display a corresponding video frame in real time. In addition, eyeballs of the user can also be tracked in the HMD apparatus, and real-time motion data of the eyeballs can be obtained, so that visual field orientation angle information is determined according to the motion data of the eyeballs. The VR device may further include a tracking system formed by a motion sensor. The tracking system can track location information and motion information of the user in a real three-dimensional space, to determine the visual field orientation angle information according to the location information and the motion information. In an embodiment, eyeballs or the head may move, and visual field orientation angle information at a corresponding time point may be comprehensively determined according to a motion trajectory of the eyeballs and a motion trajectory of the head. The VR device includes: a calculation processing unit that can obtain real-time location and motion information of the user from the tracking system and/or obtain eyeball motion data obtained by tracking the eyeballs, and calculate a three-dimensional coordinate of the user head in a virtual three-dimensional space, and with reference to the eyeball motion data obtained by tracking the eyeballs, calculate a visual field orientation of the user in the virtual three-dimensional space, and a three-dimensional coordinate of a real-time point of attention of the user. After the visual field orientation angle information of the user is determined, a visual plane of the user on a panoramic video frame that needs to be played may be determined in S103. An area corresponding to the visual plane is used as an image area, and a play video frame that can be displayed on the display interface is generated according to an image in the image area. In an embodiment, in a process of determining a visual plane in S103, a visual plane of vision persistence of the user may be obtained based on a series of experience data, such as an optimal visual range d (for example, an experience value may be 2.5 m), a field of view (FOV) (for example, an experience value may be 90°) indicating a visual field width and based on a location (x,y,z) of the user head and a visual field orientation $(\alpha, \beta, \gamma)$. The length and the width of the visual plane and a spatial three-dimensional coordinate of each point on the visual plane can be specifically obtained.

Figure 2A:
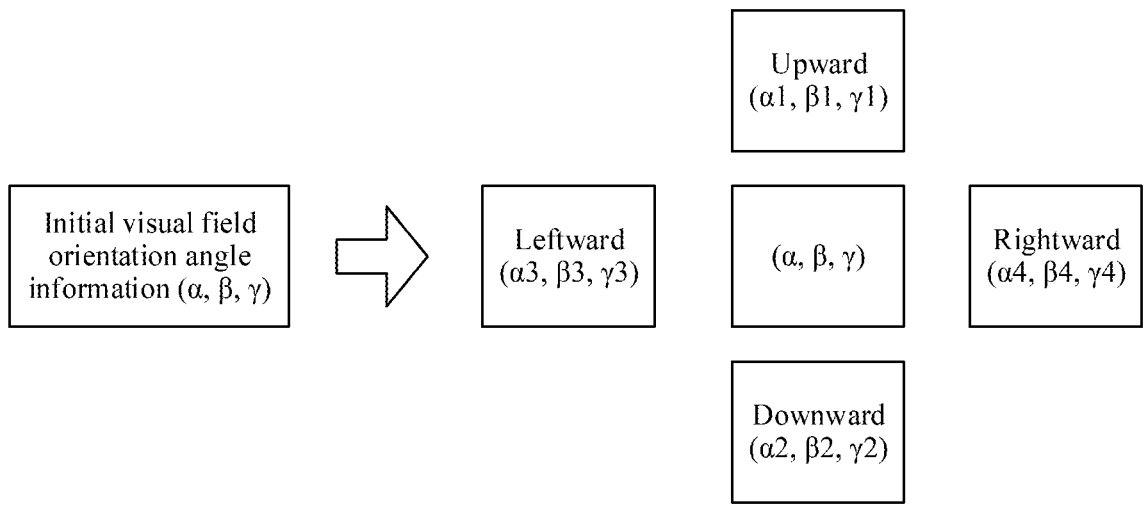
FIG. 2a is a schematic diagram of pose information in different directions according to an embodiment of this application.

In this embodiment of this application, FIG. 2a is a schematic diagram of pose information when a next unit time point T+1 (may be considered as a second time point) is predicted at a current time point T (may be considered as a first time point). The pose information involved in FIG. 2a mainly refers to visual field orientation angle information of the user. Pose information of the second time point in other embodiments may refer to displacement information of the user head, for example, leftward displacement or rightward displacement. In FIG. 2a, pose information of the first time point is initial visual field orientation angle information of the user, and is $(\alpha, \beta, \gamma)$. According to the rotation angle speed*the unit time of the user, it is obtained that possible viewing angles of the user are upward $(\alpha 1, \beta 1, \gamma 1)$, downward $(\alpha 2, \beta 2, \gamma 2)$, leftward $(\alpha 3, \beta 3, \gamma 3)$, and rightward $(\alpha 4, \beta 4, \gamma 4)$, and certainly, it is possible that the visual field orientation does not change, and is still $(\alpha, \beta, \gamma)$. Therefore, at the second time point, the viewing angle orientation angle information is: $(\alpha, \beta, \gamma)$, $(\alpha 1, \beta 1, \gamma 1)$, $(\alpha 2, \beta 2, \gamma 2)$, $(\alpha 3, \beta 3, \gamma 3)$, and $(\alpha 4, \beta 4, \gamma 4)$. The rotation angle speed of the user may be an experience value, and may be considered as a rotation angle speed when the user rotates the head to watch the panoramic video in a normal case. In other embodiments, visual field orientations in different directions may be actually obtained based on different $\alpha$ and $\beta$. For example, an oblique upward visual field orientation $(\alpha 5, \beta 5, \gamma 5)$ or the like may also be obtained.

Figure 2B:
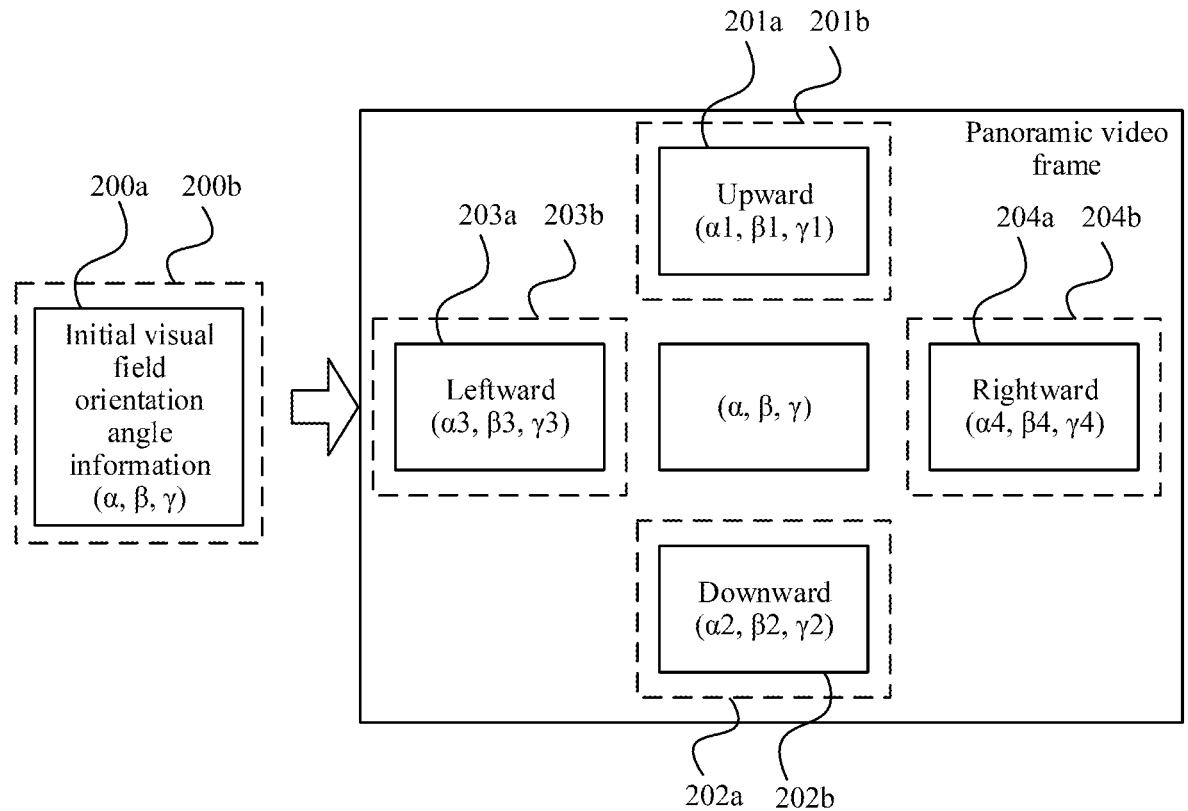
FIG. 2b is a schematic diagram of an image area in a panoramic video frame in different visual field orientation angles according to an embodiment of this application.

In FIG. 2b, in different visual field orientation angles, some images in different panoramic video frames can be seen. In this embodiment of this application, at the second time point, the upward visual field orientation angle information $(\alpha 1, \beta 1, \gamma 1)$ can correspond to the second initial video frame 201a and the second play video frame 201b, and the downward visual field orientation angle information $(\alpha 2, \beta 2, \gamma 2)$ can correspond to the second initial video frame 202a and the second play video frame 202b; the leftward visual field orientation angle information $(\alpha 3, \beta 3, \gamma 3)$ can correspond to the second initial video frame 203a and the second play video frame 203b; and the rightward visual field orientation angle information $(\alpha 4, \beta 4, \gamma 4)$ can correspond to the second initial video frame 204a and the second play video frame 204b. In an embodiment, if the user head does not rotate, a new image also appears in the middle image area at the second time point, to form a new play video frame. The current initial visual field orientation angle information at the first time point corresponds to the first play video frame 200a and the first initial video frame 200b.

In this embodiment of this application, interpolation transitioning needs to be performed between the currently played play video frame and the four new play video frames that may exist, to obtain one or more transitional initial video frames and the second initial video frame at the second time point, so that after an actual rotation direction of the user is subsequently determined, the transitional play video frame and the second play video frame that can be projected onto the display interface of the VR device for playing to the user can be obtained according to each transitional initial video frame and the second initial video frame.

In this embodiment of this application, a video frame obtained through initial processing is referred to as an initial video frame, and a video frame that can be finally projected onto the display interface and played to the user is referred to as a play video frame. Each initial video frame differs from the play video frame in that: the frame height of the initial video frame is greater than that of the play video frame, and/or, the frame width of the initial video frame is greater than that of the play video frame. In an embodiment, the frame width and the frame height of the initial video frame are correspondingly 1.4 times of the frame width and the width height of the final play video frame. The size of each initial video frame is greater than that of each play video frame, so that it can be ensured that a video pixel range seen by the user after the user actually rotates is within a pixel range of the transitional video frame, to ensure that each transitional video frame finally played to the user can be normally played. Certainly, in other embodiments, the size of each initial video frame may also be the same as that of the final play video frame.

Figure 3:
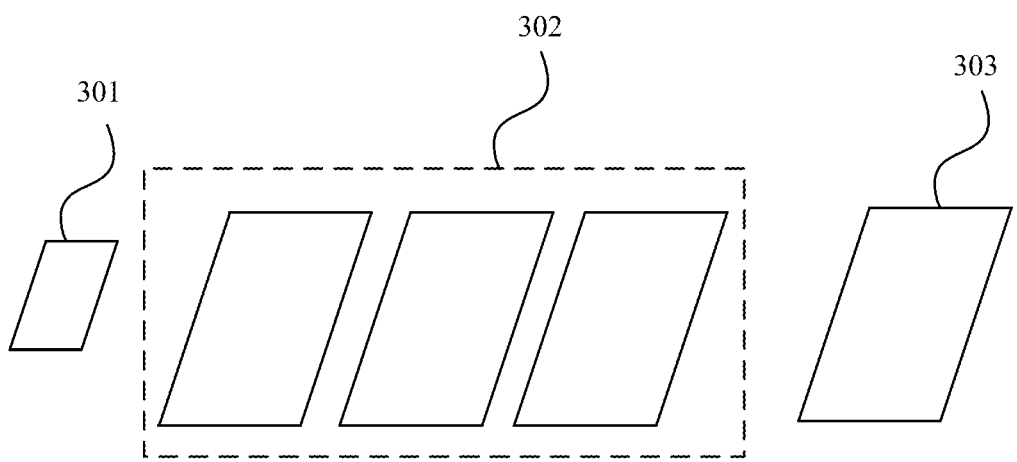
FIG. 3 is a schematic diagram of a play video frame played for a user in a panoramic video playing process according to an embodiment of this application.

In an embodiment, a number is determined according to a video frame play frequency when the panoramic video is normally played and a video frame refresh frequency of the VR device. The number is the number of transitional initial video frames between the first initial video frame and the second initial video frame. In an embodiment, if the video frame play frequency when the panoramic video is played is 30 Hz, and the VR display screen refresh frequency is 60 HZ, one transitional initial video frame can be determined between every two video frames. If the VR display screen refresh frequency is 90 HZ, two transitional initial video frames can be determined between every two video frames. If the VR display screen refresh frequency is 120 HZ, three transitional initial video frames can be determined between every two video frames. FIG. 3 is a schematic diagram of a play video frame finally displayed to the user when there are three transitional initial video frames. The play video frames include a first play video frame 301 corresponding to the first initial video frame, three transitional initial video frames 302, and the second initial video frame 303.

After the number of the transitional initial video frames is determined, an interpolation between color values of pixels at a same location between the first initial video frame and the second initial video frame may be obtained based on a preset interpolation rule, to determine a color value of the transitional pixel according to the interpolation and further generate each transitional initial video frame. The interpolation rule may be set according to requirements. In an embodiment, the color value that is of the pixel of the target location in the transitional initial video frame and that is obtained according to the set interpolation rule is within a target interval. The target interval is a color value interval determined according to the color value of the pixel of the target location in the first initial video frame and the color value of the pixel of the target location in the second initial video frame. In an embodiment, if a plurality of transitional initial video frames is included, not only it is ensured that the color value of the pixel of the target location in the transitional initial video frame is within the target interval, but also it needs to be further ensured that a change amplitude of color values of pixels at the target location in two adjacent transitional initial video frames is less than a preset amplitude threshold, to ensure that the brightness degree of the image can perform gradient transition.

Figure 4:
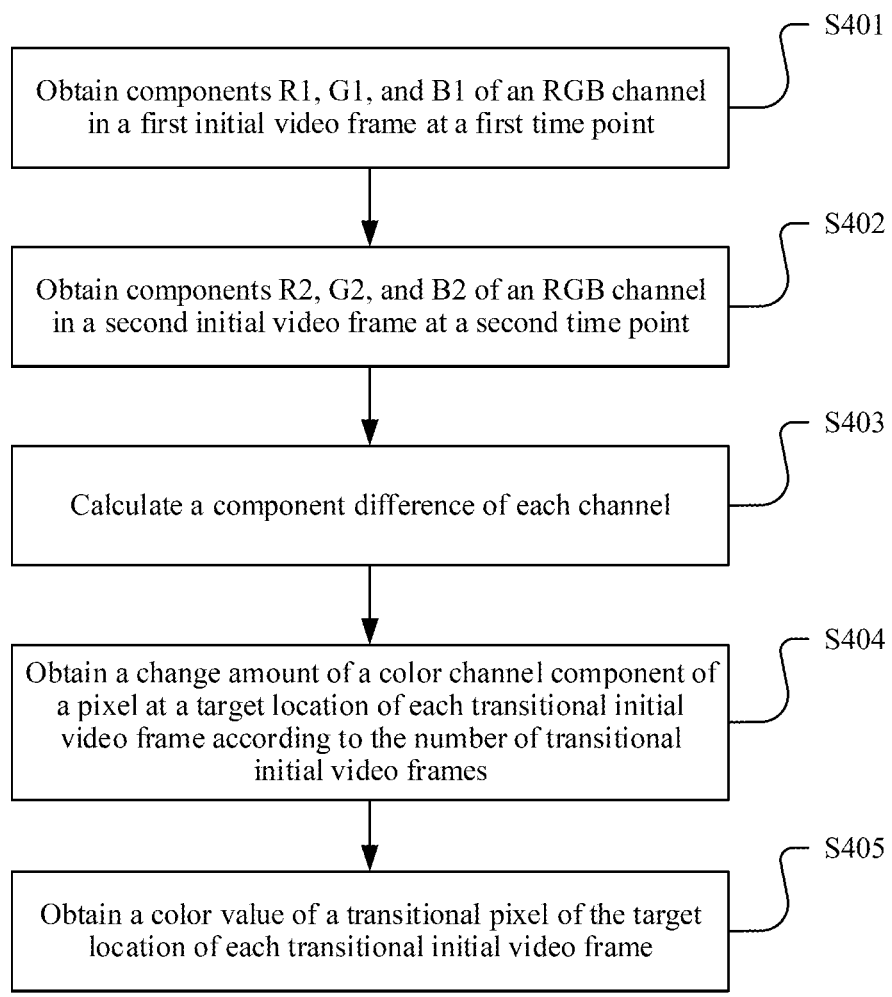
FIG. 4 is a schematic flowchart of a method for determining a color value of each transitional initial video frame according to an embodiment of this application.

In an embodiment, FIG. 4 is a schematic flowchart of a method for determining a color value of a pixel at a target location in each transitional initial video frame according to an interpolation rule according to an embodiment of this application. The target location of the first initial video frame is a pixel location coordinate, and the target location in the second initial video frame is also a pixel location coordinate. The two target locations are located on different images but the image locations are the same. Processing shown in FIG. 4 may be performed on each pixel location in the first initial video frame and the second initial video frame as the target location. The first initial video frame at the first time point and the second initial video frame at the second time point are RGB images. Components R1, G1, and B1 of an RGB channel of the target location in the first initial video frame at the first time point are obtained in S401, and components R2, G2, and B2 of an RGB channel of the target location in the second initial video frame at the second time point are obtained in S402. A component difference of the channel is calculated in S403. The calculation manner may be DR=R2-R1, DG=G2-G1, DB=B2-B1, and the component difference is an absolute value. The change amount of the color channel component of the pixel at the target location of each transitional initial video frame is obtained according to the determined number of transitional initial video frames in S404. The calculation manner may be DTR=DR/N, DTG=DG/N, and DTB=DB/N. In S405, the color value of the transitional pixel of the target location of each transitional initial video frame is obtained according to each color channel component of the pixel at the target location of the first initial video frame and the change amount of each color channel component. The calculation manner may be: RC1=R1+n*DTR, GC2=G2+n*DTG, and BC3=B3+n*DTB, where n is the number of the transitional initial video frame; if there are three transitional initial video frames, n is sequentially equal to 1, 2, and 3; if there are two frames, n is sequentially equal to 1 and 2; if there is only one frame, n=1. Each color value component of the nth transitional initial video frame obtained after S404 is (RC1, GC2, BC3), and a color value of a pixel of a target location in the nth transitional initial video frame is obtained according to the color value component.

The intermediate transitional initial video frame is determined according to color values of pixels of all locations in the first initial video frame and the second initial video frame. In an embodiment, only locations of pixels in the target areas in the first initial video frame and the second initial video frame may also be separately used as the target location. In an embodiment, the target area may include: the target area in the first initial video frame is white, and the target area in the second initial video frame is black; or, the target area in the first initial video frame is black, and the target area in the second initial video frame is white. That is, the foregoing differential processing may be performed only on a jumping part from black to white or from white to black in the video frame. Color value interpolation is not performed on pixels of areas other than one or more target areas. Color values of pixels of other areas may be the same as the color value of the pixel of the corresponding location of the first initial video frame, or the same as the color value of the pixel of the corresponding location of the second initial video frame. In an embodiment, the target area may further refer to: in the first initial video frame and the second initial video frame, if an absolute value of a difference between color values of pixels in the target area is greater than a preset difference threshold, it can be considered that a difference between color values of the pixels at the same location is relatively large. Similarly, the color values of the pixels outside the target area may be the same as the color value of the pixel at the same location in the first initial video frame, or may be the same as the color value of the pixel at the same location in the second initial video frame.

RGB channel components of black and white pixels may be user-defined. In an embodiment, a series of non-pure-black black in different color values (0, 0, 0) to (1, 1, 1) in RGB may also be defined as black. Reference may be made to the following Table 1 for exemplary defined values. As shown in Table 1, when it is detected that the color value of the pixel of the target location in the first initial video frame at the first time point is #1C1C1C (grey11), and the color value of the pixel at the target location in the second initial video frame at the second time point is #828282 (grey51), it may be considered that a difference between color values of them is relatively large. If another target location relatively near the target location also has a relatively large color value difference, it may be considered that an area formed by the target location and the other target location is the target area, and color value interpolation needs to be performed based on the target area, to form a transitional initial video frame.

TABLE 1

| Identifier | Color component | Color value |
|---|---|---|
| grey11 | 28 28 28 | #1C1C1C |
| grey21 | 54 54 54 | #363636 |
| grey31 | 79 79 79 | #4F4F4F |
| grey41 | 105 105 105 | #696969 |
| grey51 | 130 130 130 | #828282 |
| grey61 | 156 156 156 | #9C9C9C |
| grey71 | 181 181 181 | #B5B5B5 |
| grey81 | 207 207 207 | #CFCFCF |
| grey91 | 232 232 232 | #E8E8E8 |

After the color value at each target location is obtained or when it is detected that the user moves towards a direction, an actual visual field orientation angle of the user is obtained, and a corresponding target initial video frame group is determined according to the actual visual field orientation angle. The target initial video frame group includes a second initial video frame that is in a direction and that is obtained through estimation and a transitional initial video frame. For example, if the user rotates leftward to ($\alpha 3$, $\beta 3$, $\gamma 3$), the leftward second initial video frame and a transitional initial video frame correspondingly obtained according to the leftward second initial video frame are selected. The actual visual field orientation angle of the user may be detected based on a motion sensor on the VR device.

After the target initial video frame group is obtained, each initial video frame in the target initial video frame group needs to be projected onto a display interface of the VR device. A pixel range to be projected onto the display interface of the VR device may be obtained according to a field of view (FOV) of the VR device. Pixel coordinate matching is performed on each initial video frame in the target initial video frame group according to the pixel range, to select pixels that need to be projected, to form an actual transitional play video play and a second play video frame, and then the video frames are sequentially played on the VR display interface according to a time order. The FOV of the VR device is an inherent parameter of the VR device.

In this embodiment of this application, a second time point can be determined through prediction, and some transitional video frames are generated according to the video frame of the second time point and the video frame of the current first time point, so that it can be ensured that a degree of a pixel color change between the video frame played at the first time point and the video frame played at the second time point is relatively small, and bad stimulation caused to eyes of the user during playing of the panoramic video can be effectively reduced, and in the entire process, the user does not need to manually adjust the playing brightness of devices such as a VR device, to meet the requirements of automation and intelligentization of the user.

Figure 5:
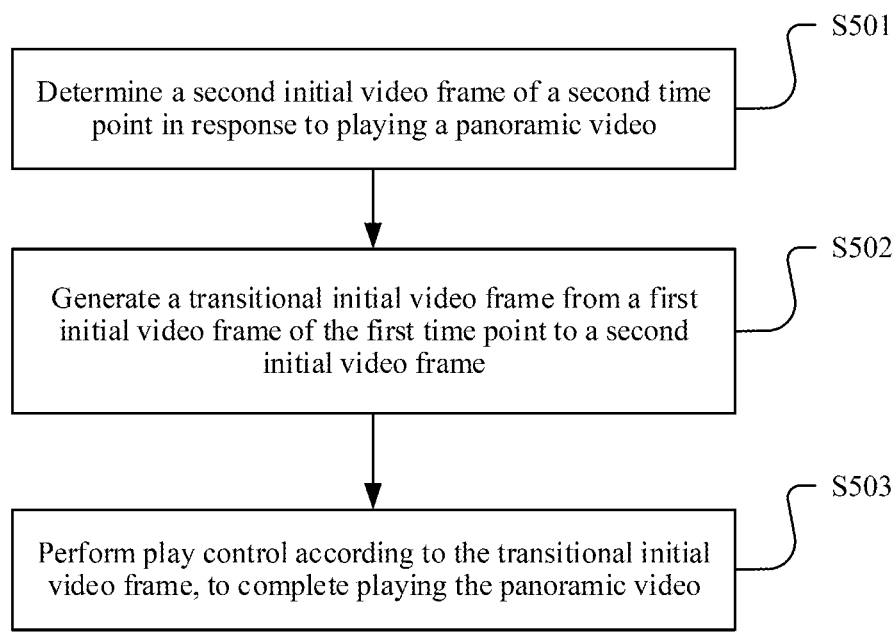
FIG. 5 is a schematic flowchart of a video processing method according to an embodiment of this application.

FIG. 5 is a schematic flowchart of a video processing method according to an embodiment of this application. The method in this embodiment of this application may be performed by a terminal device configured to play a panoramic video. In an embodiment, the method may be performed by a VR device that can play a panoramic video. The method in this embodiment of this application includes the following steps.

In S501, a second initial video frame of a second time point is determined in response to playing a panoramic video, the second time point being after a first time point. There may be a difference of one unit of time between the first time point and the second time point. The unit of time may be determined according to a video frame play frequency when the panoramic video is played. For example, when the video frame play frequency is 30 Hz, the unit of time is 1/30 second.

In an embodiment, there may be one or more second initial video frames corresponding to the second time point. If a motion direction of the user is learned in advance, the second initial video frame is a video frame formed by a partial image in a visual field orientation angle corresponding to the motion direction in a panoramic video frame played at the second time point. For example, as shown in FIG. 2a, if it is learned in advance that the user rotates leftward, it may be considered that in the panoramic video played at the second time point, the corresponding second initial video frame can be obtained according to a partial image that can be watched in the (α3, β3, γ3) visual field orientation angle corresponding to the leftward motion direction. Similarly, if the motion direction of the user is not learned, the leftward, rightward, upward, downward, and still cases in FIG. 2a may be used as a predicted motion direction, and then five second initial video frames are determined.

In S502, a transitional initial video frame is generated from a first initial video frame of the first time point to a second initial video frame, a color value of a pixel of a target location in the transitional initial video frame being located within a target interval, and the target interval being a color value interval determined according to a color value of a pixel of the target location in the first initial video frame and a color value of pixel of the target location in the second initial video frame. That is, the transitional initial video frame is generated between the first time point and the second time point. The video frames make a change in amplitude of the pixel at each target location relatively small. In particular, between the first time point and the second time point, when a pixel at a target location jumps from black to white, based on the transitional initial video frame, the target location can gradually change from black to white between the first time point and the second time point.

In S503, play control is performed according to the transitional initial video frame, to complete playing the panoramic video. The performing play control according to the transitional initial video frame mainly includes processing the transitional initial video frame and the second initial video frame, to obtain a transitional play video frame and a second play video frame that can be actually projected onto the display interface of the VR device, and the video frames are played to the user. In an embodiment, a pixel range of the transitional initial video frame and the second initial video frame may be determined based on the FOV of the VR device, and then the transitional play video frame and the second play video frame are extracted and determined, and the transitional play video frames are sequentially played according to a time order between the first time point and the second time point, and the second play video frame is finally played.

In an embodiment, the transitional initial video frame generated in S502 may be transitional initial video frame data, and an image can be generated by using the transitional initial video frame data and the image is displayed on the display interface for the user to watch.

Reference may be made to descriptions of the foregoing content for implementation of steps in the method in this embodiment of this application.

Figure 6:
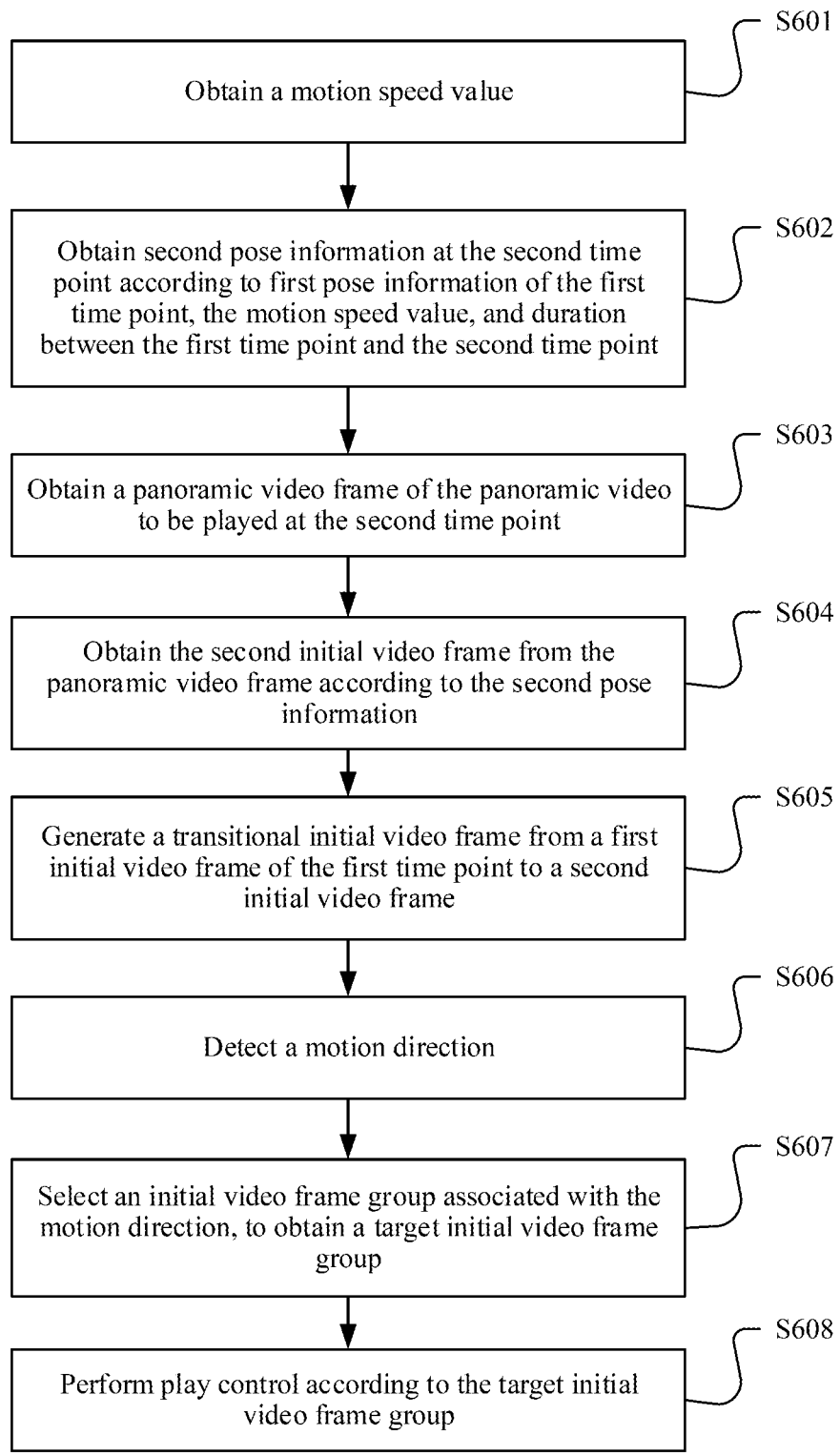
FIG. 6 is a schematic flowchart of another video processing method according to an embodiment of this application.

FIG. 6 is a schematic flowchart of another video processing method according to an embodiment of this application. The method in this embodiment of this application may be performed by a terminal device configured to play a panoramic video. In an embodiment, the method may be performed by a VR device that can play a panoramic video. The method in this embodiment of this application includes the following steps.

In S601, a motion speed value is obtained. The motion speed value may be an estimated value, and the motion speed value may be dynamically determined according to an angular velocity of a user's head rotation in a process of wearing a VR device to watch the panoramic video in a period of time, for example, an average angular velocity within a period of time.

In S602, second pose information is obtained at the second time point according to first pose information of the first time point, the motion speed value, and a duration between the first time point and the second time point. In an embodiment, a pose change amount, such as an angle change amount, from the first time point to the second time point may be calculated according to the motion speed value and the duration between the first time point and the second time point, so that second pose information is obtained. Because the motion speed value is an estimated value, the second pose information is also an estimated value, and is not pose information after actual rotation of the user. To facilitate the subsequent process, the transitional initial video frame is calculated in advance, so that the transitional play video frame corresponding to each transitional initial video frame is played before the second play video frame of the second time point is finally played.

In S603, a panoramic video frame of the panoramic video to be played at the second time point is obtained. After recording of the panoramic video is completed, the panoramic video frame at each time point is known, and the panoramic video frame can be obtained based on the time point, to facilitate subsequent interception of a partial image from the panoramic video frame, to form the second initial video frame and the second play video frame that can be played and displayed on the display interface.

In S604, the second initial video frame from the panoramic video frame according to the second pose information. S601 to S604 correspond to S501 in the previous embodiment. The second pose information is a piece of visual field orientation angle information. A partial image can be found and intercepted from the panoramic video frame according to the visual field orientation angle of the user, to form the second initial video frame, and reference may be made to FIG. 3.

In an embodiment, a frame width of the second initial video frame obtained from the panoramic video frame is greater than a frame width of a play video frame that can be actually played and displayed on a display interface; and/or a frame height of the second initial video frame obtained from the panoramic video frame is greater than a frame height of the play video frame that can be actually played and displayed on the display interface; the play video frame that can be played and displayed on the display interface is a video frame formed by a partial image that is in the panoramic video frame and that is projected onto the terminal display interface in the second pose information. Also referring to FIG. 2b, the size of the second initial video frame is greater than the size of the second play video frame that can be actually displayed on the display interface, so that it can be ensured that the transitional play video frame between the first time point and the second time point can be accurately obtained, and can be normally played.

In an embodiment, the motion speed value includes rotation angular velocity values in at least two different directions, the second pose information is visual field orientation angle information; each direction is associated with an initial video frame group, and each initial video frame group includes a second initial video frame and a transitional initial video frame obtained according to the second initial video frame.

In S605, a transitional initial video frame is generated from a first initial video frame of the first time point to a second initial video frame, a color value of a pixel of a target location in the transitional initial video frame being located within a target interval, and the target interval being a color value interval determined according to a color value of a pixel of the target location in the first initial video frame and a color value of pixel of the target location in the second initial video frame.

In an embodiment, S605 may include: obtaining a first color value of the pixel of the target location in the first initial video frame of the first time point; obtaining a second color value of the pixel of the target location in the second initial video frame; performing interpolation according to the first color value and the second color value, to obtain the color value of the transitional pixel of the target location of the transitional initial video frame; and after obtaining color values of a plurality of transitional pixels, generating the transitional initial video frame according to the obtained pixel values of all the transitional pixels.

In an embodiment, the performing interpolation according to the first color value and the second color value, to obtain the color value of the transitional pixel of the target location of the transitional initial video frame includes: performing differential calculation on a color channel component in the first color value and a color channel component in the second color value, to obtain a component difference of each color channel component; obtaining a change amount of each color channel component according to a number of transitional initial video frames that need to be generated; and obtaining the color value of the transitional pixel of the target location of each transitional initial video frame according to each color channel component of the first color value, the number of the transitional initial video frames that need to be generated, and the change amount of each color channel component. In an embodiment, reference may be made to the descriptions of the embodiment corresponding to FIG. 4 for a calculation process of the color value of the transitional pixel.

In an embodiment, pixel locations of all pixels of the first initial video frame and the second initial video frame are separately used as the target location; or, the color value of the pixel of the target location in the first initial video frame is black, and the color value of the pixel of the target location in the second initial video frame is white; or the color value of the pixel of the target location in the first initial video frame is white, and the color value of the pixel of the target location in the second initial video frame is black.

In an embodiment, the number of transitional initial video frames may be determined, to perform interpolation based on a number. The determining the number of transitional initial video frames between the first time point and the second time point includes: obtaining a video frame refresh frequency of the terminal; obtaining a video frame play frequency when the panoramic video is played; determining a number of transitional initial video frames according to the video frame refresh frequency and the video frame play frequency, a number of the generated transitional initial video frames being the same as the determined number. In an embodiment, if the video frame play frequency when the panoramic video is played is 30 Hz, and the VR display screen refresh frequency is 60 HZ, one transitional initial video frame can be determined between every two video frames. If the VR display screen refresh frequency is 90 HZ, two transitional initial video frames can be determined between every two video frames. If the VR display screen refresh frequency is 120 HZ, three transitional initial video frames can be determined between every two video frames.

In S606, a motion direction is detected. The motion direction of the VR device may be detected according to the sensor on the VR device. For example, it may be detected by using a gyroscope whether the VR device rotates upward, downward, leftward, rightward, or does not move.

In S607, an initial video frame group associated with the motion direction is selected, to obtain a target initial video frame group. For example, after it is determined that the user head rotates leftward, the second play video frame 203a shown in FIG. 2b and each transitional initial video frame calculated based on the second play video frame 203a may be selected, to obtain the target initial video frame group.

In S608, play control is performed according to the target initial video frame group. In an embodiment, the second play video frame and each transitional play video frame that can be displayed on the display interface of the VR device may be generated according to the sizes of the second initial video frame and each transitional initial video frame in the initial video frame group, and each second play video frame and each transitional play video frame are played on the display interface.

In an embodiment, S608 may specifically include: obtaining a visual field angle parameter of the terminal; determining, according to the visual field angle parameter, a pixel range projected onto the terminal display interface; performing pixel coordinate matching on each initial video frame in the target initial video frame group according to the pixel range, to select pixels that need to be projected to form a transitional play video frame and a second play video frame; and sequentially playing the transitional play video frame and the second play video frame according to a time order.

For exemplary implementations of steps in the method according to this embodiment of this application, refer to the description of related content in the foregoing embodiments.

In this embodiment of this application, a second time point can be determined through prediction, and some transitional video frames are generated according to the video frame of the second time point and the video frame of the current first time point, so that it can be ensured that a degree of a pixel color change between the video frame played at the first time point and the video frame played at the second time point is relatively small, and bad stimulation caused to eyes of the user during playing of the panoramic video can be effectively reduced, and in the entire process, the user does not need to manually adjust the playing brightness of devices such as a VR device, to meet the requirements of automation and intelligentization of the user.

In an embodiment, an intelligent terminal is further provided. An internal structure of the intelligent terminal may be shown in FIG. 9. The intelligent terminal includes a video processing apparatus. The video processing apparatus includes modules, and each module may be completely or partially implemented by software, hardware, or a combination thereof.

A video processing apparatus and an intelligent terminal according to the embodiments of this application are described in detail below.

Figure 7:
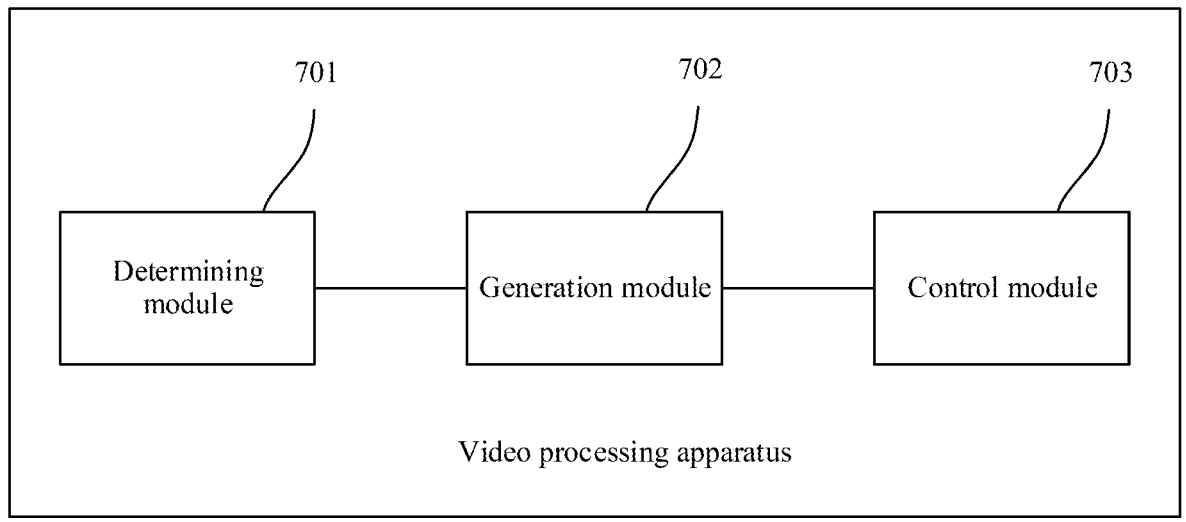
FIG. 7 is a schematic structural diagram of a video processing apparatus according to an embodiment of this application.

FIG. 7 is a schematic structural diagram of a video processing apparatus according to an embodiment of this application. The apparatus in this embodiment of this application may be disposed on a terminal for panoramic play, such as a VR terminal. The apparatus includes the following modules:

a determining module 701, configured to determine a second initial video frame of a second time point in response to playing a panoramic video, the second time point being after a first time point;

a generation module 702, configured to generate a transitional initial video frame from a first initial video frame of the first time point to a second initial video frame, a color value of a pixel of a target location in the transitional initial video frame being located within a target interval, and the target interval being a color value interval determined according to a color value of a pixel of the target location in the first initial video frame and a color value of pixel of the target location in the second initial video frame; and a control module 703, configured to perform play control according to the transitional initial video frame, to complete playing the panoramic video.

The modules can be implemented by circuitry for example.

In an embodiment, the determining module 701 is configured to: obtain a motion speed value; obtain second pose information at the second time point according to first pose information of the first time point, the motion speed value, and duration between the first time point and the second time point; obtain a panoramic video frame of the panoramic video to be played at the second time point; and obtain the second initial video frame from the panoramic video frame according to the second pose information.

In an embodiment, a frame width of the second initial video frame obtained from the panoramic video frame is greater than a frame width of a play video frame that can be actually played and displayed on a display interface; and/or a frame height of the second initial video frame obtained from the panoramic video frame is greater than a frame height of the play video frame that can be actually played and displayed on the display interface; the play video frame that can be actually played and displayed on the display interface is a video frame formed by a partial image that is in the panoramic video frame and that is projected onto the terminal display interface.

In an embodiment, the motion speed value includes rotation angular velocity values in at least two different motion directions, the second pose information is visual field orientation angle information; each motion direction is associated with an initial video frame group, and each initial video frame group includes a second initial video frame and a transitional initial video frame obtained according to the second initial video frame.

In an embodiment, the generation module 702 is further configured to: obtain a video frame refresh frequency of the terminal; obtain a video frame play frequency during playing of the panoramic video; determine a number of transitional initial video frames according to the video frame refresh frequency and the video frame play frequency, a number of the generated transitional initial video frames being the same as the determined number.

In an embodiment, when configured to generate the transitional initial video frame from the first initial video frame of the first time point to the second initial video frame, the generation module 702 is configured to: obtain a first color value of the pixel of the target location in the first initial video frame of the first time point; obtain a second color value of the pixel of the target location in the second initial video frame; perform interpolation according to the first color value and the second color value, to obtain the color value of the transitional pixel of the target location of the transitional initial video frame; and after obtaining color values of a plurality of transitional pixels, generate the transitional initial video frame according to the obtained pixel values of all the transitional pixels.

In an embodiment, when configured to perform interpolation according to the first color value and the second color value, to obtain the color value of the transitional pixel of the target location of the transitional initial video frame, the generation module 702 is configured to: perform differential calculation on a color channel component in the first color value and a color channel component in the second color value, to obtain a component difference of each color channel component; obtain a change amount of each color channel component according to a number of transitional initial video frames that need to be generated; and obtain the color value of the transitional pixel of the target location of each transitional initial video frame according to each color channel component of the first color value, the number of the transitional initial video frames that need to be generated, and the change amount of each color channel component.

In an embodiment, pixel locations of all pixels of the first initial video frame and the second initial video frame are separately used as the target location; or, the color value of the pixel of the target location in the first initial video frame is black, and the color value of the pixel of the target location in the second initial video frame is white; or the color value of the pixel of the target location in the first initial video frame is white, and the color value of the pixel of the target location in the second initial video frame is black.

In an embodiment, the control module 703 is configured to: detect a motion direction; select an initial video frame group associated with the motion direction, to obtain a target initial video frame group; and perform play control according to the target initial video frame group.

In an embodiment, when configured to perform play control according to the target initial video frame group, the control module 703 is configured to: obtain a visual field angle parameter of the terminal; determine, according to the visual field angle parameter, a pixel range projected onto the terminal display interface; perform pixel coordinate matching on each initial video frame in the target initial video frame group according to the pixel range, to form a transitional play video frame and a second play video frame; and sequentially play the transitional play video frame and the second play video frame according to a time order.

In this embodiment of this application, reference may be made to descriptions of related content in the foregoing embodiments for implementation of each functional module in the apparatus.

In this embodiment of this application, a second time point can be determined through prediction, and some transitional video frames are generated according to the video frame of the second time point and the video frame of the current first time point, so that it can be ensured that a degree of a pixel color change between the video frame played at the first time point and the video frame played at the second time point is relatively small, and bad stimulation caused to eyes of the user during playing of the panoramic video can be effectively reduced, and in the entire process, the user does not need to manually adjust the playing brightness of devices such as a VR device, to meet the requirements of automation and intelligentization of the user.

Figure 8:
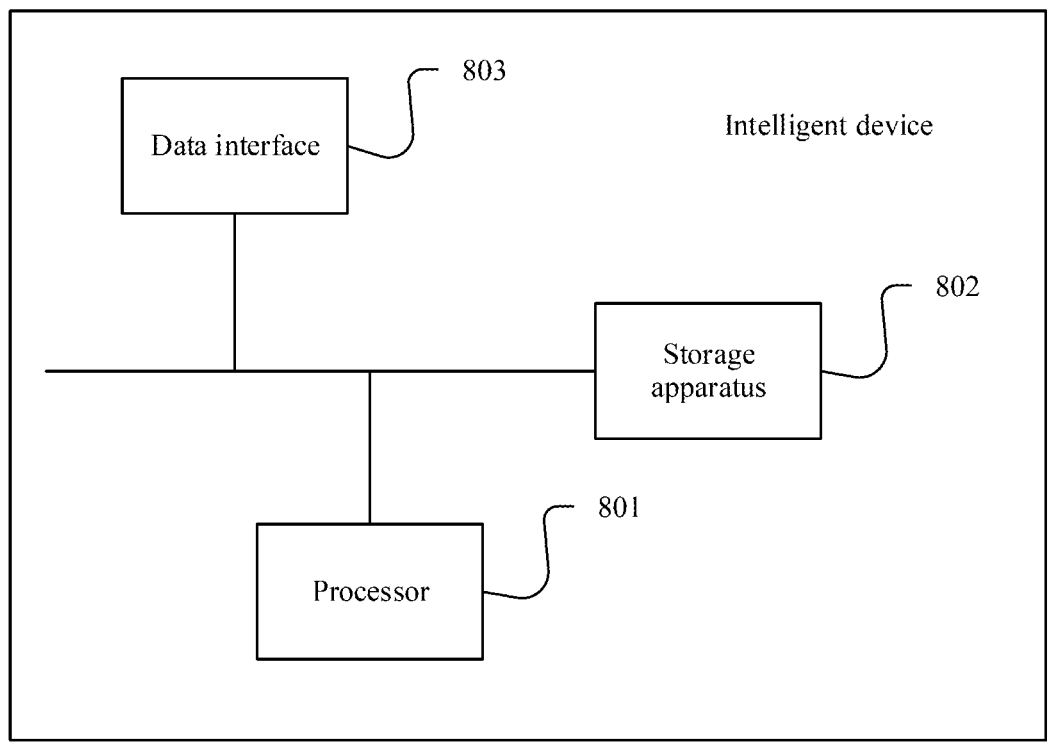
FIG. 8 is a schematic structural diagram of an intelligent terminal according to an embodiment of this application.

FIG. 8 is a schematic structural diagram of an intelligent terminal according to an embodiment of this application. The terminal in this embodiment of this application may be a terminal that can play a panoramic video, such as a VR device. The intelligent terminal includes structures such as a power supply module. In this embodiment of this application, a processor 801, a storage apparatus 802, and a data interface 803 are further included. A data connection is established between the processor 801, the storage apparatus 802, and the data interface 803 in manners such as a bus.

The data interface 803 is configured to: receive external data, and send the external data to the processor 801 or store the external data into the storage apparatus 802. The storage apparatus 802 may include a volatile memory, for example, a random-access memory (RAM). The storage apparatus 802 may also include a non-volatile memory, for example, a flash memory, a solid-state drive (SSD), and the like. The storage apparatus 802 may further include a combination of the foregoing types of memories.

The processor 801 may be circuitry such as central processing unit (CPU) 801. The processor 801 may further include a hardware chip. The hardware chip may be an application-specific integrated circuit (ASIC), a programmable logic device (PLD), and the like. The PLD may be a field-programmable gate array (FPGA), a generic array logic (GAL), or the like.

Optionally, the storage apparatus 802 is further configured to store a program instruction. The processor 801 may invoke the program instruction, to implement the method mentioned in this embodiment of this application.

In an embodiment, the processor 801 invokes the program instruction for: determining a second initial video frame of a second time point in response to playing a panoramic video, the second time point being after a first time point; generating a transitional initial video frame from a first initial video frame of the first time point to a second initial video frame, a color value of a pixel of a target location in the transitional initial video frame being located within a target interval, and the target interval being a color value interval determined according to a color value of a pixel of the target location in the first initial video frame and a color value of pixel of the target location in the second initial video frame; and performing play control according to the transitional initial video frame, to complete playing the panoramic video.

In an embodiment, when configured to determine the second initial video frame of the second time point, the processor 801 is configured to: obtain a motion speed value; obtain second pose information at the second time point according to first pose information of the first time point, the motion speed value, and duration between the first time point and the second time point; obtain a panoramic video frame of the panoramic video to be played at the second time point; and obtain the second initial video frame from the panoramic video frame according to the second pose information.

In an embodiment, a frame width of the second initial video frame obtained from the panoramic video frame is greater than a frame width of a play video frame that can be actually played and displayed on a display interface; and/or a frame height of the second initial video frame obtained from the panoramic video frame is greater than a frame height of the play video frame that can be actually played and displayed on the display interface; the play video frame that can be actually played and displayed on the display interface is a video frame formed by a partial image that is in the panoramic video frame and that is projected onto the terminal display interface.

In an embodiment, the motion speed value includes rotation angular velocity values in at least two different motion directions, the second pose information is visual field orientation angle information; each motion direction is associated with an initial video frame group, and each initial video frame group includes a second initial video frame and a transitional initial video frame obtained according to the second initial video frame.

In an embodiment, the processor 801 is further configured to: obtain a video frame refresh frequency of the terminal; obtain a video frame play frequency during playing of the panoramic video; determine a number of transitional initial video frames according to the video frame refresh frequency and the video frame play frequency, a number of the generated transitional initial video frames being the same as the determined number.

In an embodiment, when configured to generate the transitional initial video frame from the first initial video frame of the first time point to the second initial video frame, the processor 801 is configured to: obtain a first color value of the pixel of the target location in the first initial video frame of the first time point; obtain a second color value of the pixel of the target location in the second initial video frame; perform interpolation according to the first color value and the second color value, to obtain the color value of the transitional pixel of the target location of the transitional initial video frame; and after obtaining color values of a plurality of transitional pixels, generate the transitional initial video frame according to the obtained pixel values of all the transitional pixels.

In an embodiment, when configured to perform interpolation according to the first color value and the second color value, to obtain the color value of the transitional pixel of the target location of the transitional initial video frame, the processor 801 is configured to: perform differential calculation on a color channel component in the first color value and a color channel component in the second color value, to obtain a component difference of each color channel component; obtain a change amount of each color channel component according to a number of transitional initial video frames that need to be generated; and obtain the color value of the transitional pixel of the target location of each transitional initial video frame according to each color channel component of the first color value, the number of the transitional initial video frames that need to be generated, and the change amount of each color channel component.

In an embodiment, pixel locations of all pixels of the first initial video frame and the second initial video frame are separately used as the target location; or, the color value of the pixel of the target location in the first initial video frame is black, and the color value of the pixel of the target location in the second initial video frame is white; or the color value of the pixel of the target location in the first initial video frame is white, and the color value of the pixel of the target location in the second initial video frame is black.

In an embodiment, when configured to perform play control according to the transitional initial video frame, the processor 801 is configured to: detect a motion direction; select an initial video frame group associated with the motion direction, to obtain a target initial video frame group; and perform play control according to the target initial video frame group.

In an embodiment, when configured to perform play control according to the target initial video frame group, the processor 801 is configured to: obtain a visual field angle parameter of the terminal; determine, according to the visual field angle parameter, a pixel range projected onto the terminal display interface; perform pixel coordinate matching on each initial video frame in the target initial video frame group according to the pixel range, to form a transitional play video frame and a second play video frame; and sequentially play the transitional play video frame and the second play video frame according to a time order.

In this embodiment of this application, reference may be made to descriptions of related content in the foregoing embodiments for implementation of each function of the processor 801.

In this embodiment of this application, a second time point can be determined through prediction, and some transitional video frames are generated according to the video frame of the second time point and the video frame of the current first time point, so that it can be ensured that a degree of a pixel color change between the video frame played at the first time point and the video frame played at the second time point is relatively small, and bad stimulation caused to eyes of the user during playing of the panoramic video can be effectively reduced, and in the entire process, the user does not need to manually adjust the playing brightness of devices such as a VR device, to meet the requirements of automation and intelligentization of the user.

Figure 9:
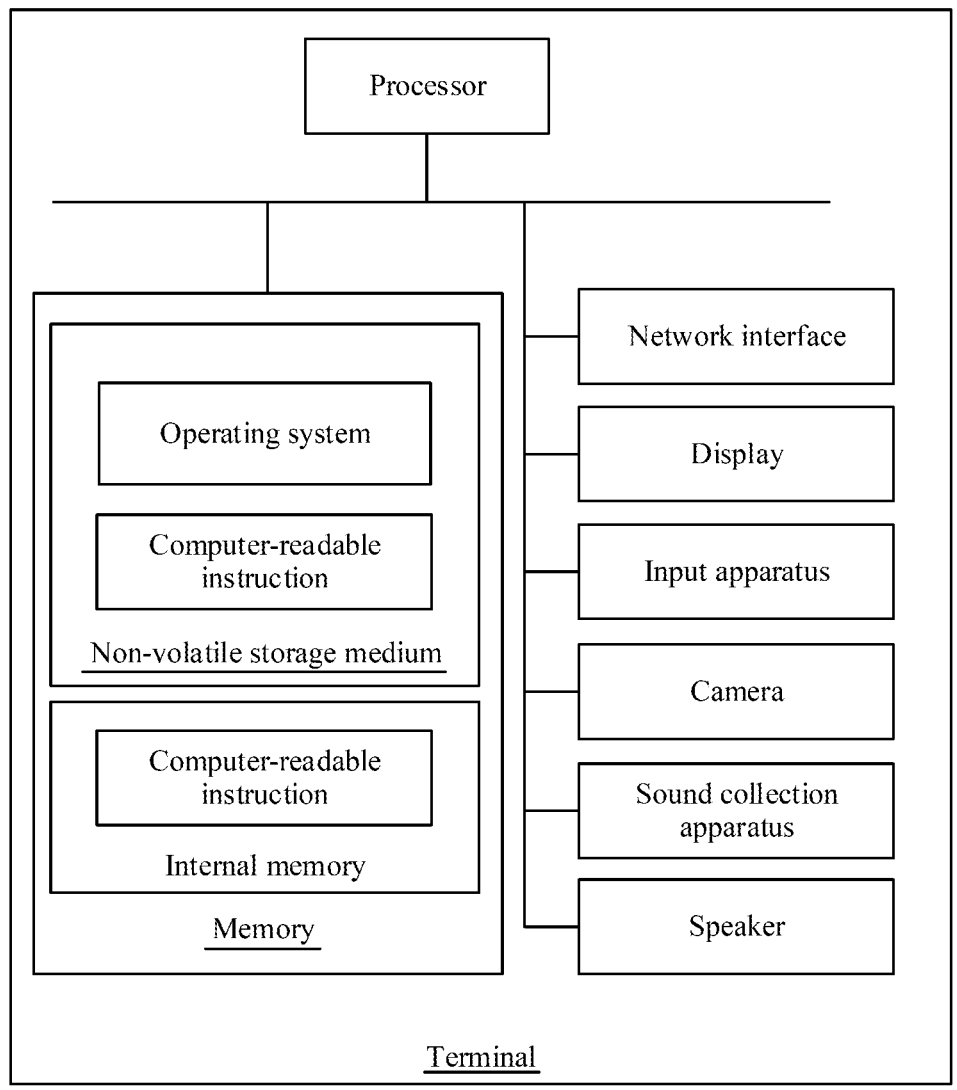
FIG. 9 is a diagram of an internal structure of an intelligent terminal according to an embodiment of this application.

In an embodiment, FIG. 9 provides a diagram of an internal structure of an intelligent terminal. The terminal includes a processor, a memory, a network interface, an input apparatus, and a display that are connected via a system bus. The memory includes a non-volatile storage medium and an internal memory. The non-volatile storage medium of the computer device stores an operating system, and may further store computer-readable instructions. The computer-readable instructions, when executed by the processor, may cause the processor to implement a video processing method. The internal memory may also store computer-readable instructions. The computer-readable instructions, when executed by the processor, may cause the processor to implement a video processing method. The display of the computer device may be a liquid crystal display or an e-ink display. The input apparatus of the computer device may be a touch layer covering the display, or may be a button, a trackball, or a touchpad disposed on a housing of the computer device, or may be an external keyboard, touchpad, a mouse or the like. A person skilled in the art may understand that, the structure shown in FIG. 9 is merely an exemplary block diagram of a structure of a part related to a solution of this application, and does not constitute any limitation on the server to which the solution of this application is applied. A specific server may include more or fewer components than those shown in the figure, or some components may be combined, or a different component deployment may be used.

It should be understood that the steps in the embodiments of this application are not necessarily performed in an order indicated by the step numbers. Unless explicitly stated in this specification, the execution of these steps is not strictly sequential, and these steps may be executed in another sequence. Moreover, at least some of the steps in each embodiment may include a plurality of sub-steps or stages, which may not necessarily be completed at the same moment, but may be performed at different moments. These sub-steps or stages are not necessarily performed in sequence, but may be performed in turn or alternately with at least some of other steps or sub-steps or stages of the other steps.

A person of ordinary skill in the art may understand that some or all procedures in the method in the foregoing embodiments may be implemented by a computer-readable instruction instructing related hardware, the program may be stored in a non-transitory or non-volatile computer readable storage medium, and when the program is executed, the procedures in the foregoing method embodiments may be implemented. Any reference to a memory, storage, database or other medium used in the various embodiments provided herein may include non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of illustration and not limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus (Rambus) direct RAM (RDRAM), a direct rambus dynamic RAM (DRDRAM), and a rambus dynamic RAM (RDRAM).

The foregoing disclosure is merely some embodiments of this application, and certainly is not intended to limit the protection scope of this application. A person of ordinary skill in the art can understand all or some flows of the foregoing embodiments, and equivalent variations made in accordance with the claims of this application shall fall within the scope of this application.

What is claimed is:

1. A video processing method, comprising:
determining, by circuitry of a terminal, a second video frame portion associated with a second time point that is after a first time point associated with a first video frame portion of a video;
generating a transitional video frame based on differences between first color values of pixels in the first video frame portion and second color values of pixels in the second video frame portion, a transitional color value of a pixel at a target pixel location in the transitional video frame being within a target color interval, and the target color interval being determined according to a first color value of the first color values that corresponds to the pixel at the target pixel location in the first video frame portion and a second color value of the second color values that corresponds to the pixel at the target pixel location in the second video frame portion; and
performing, by the circuitry, display control of the video according to the transitional video frame,
wherein the first color value that corresponds to the pixel at the target pixel location in the first video frame portion is one of black and white, and the second color value that corresponds to the pixel at the target pixel location in the second video frame portion is the other one of black and white.

2. The method according to claim 1, wherein the determining comprises:
obtaining, by the circuitry, motion speed information;
obtaining, by the circuitry, second pose information of the second time point according to first pose information of the first time point, the motion speed information, and a difference between the first time point and the second time point;
obtaining, by the circuitry, a second video frame of the video to be displayed at the second time point; and
obtaining, by the circuitry, the second video frame portion from the second video frame according to the second pose information.

3. The method according to claim 2, wherein
a width of the second video frame portion obtained from the second video frame is greater than a width of a video image that is displayed; and
the displayed video image is a partial image of the second video frame.

4. The method according to claim 3, wherein
a height of the second video frame portion obtained from the second video frame is greater than a height of the displayed video image.

5. The method according to claim 2, wherein
the motion speed information indicates rotation angular velocity values in at least two different motion directions,
the second pose information is visual field orientation angle information, and
a plurality of different motion directions is associated with initial video frame groups, and each initial video frame group includes a candidate second video frame portion and a candidate transitional video frame generated based on the second video frame portion.

6. The method according to claim 1, further comprising:
obtaining, by the circuitry, a video frame refresh frequency of the terminal;
obtaining, by the circuitry, a video frame play frequency during playing of the video; and
determining, by the circuitry, a number of transitional video frames according to the video frame refresh frequency and the video frame play frequency, wherein the generating includes generating the determined number of transitional video frames.

7. The method according to claim 1, wherein the generating comprises:
obtaining, by the circuitry, the first color value of the pixel of the target pixel location in the first video frame portion;
obtaining, by the circuitry, the second color value of the pixel of the target pixel location in the second video frame portion;
obtaining, by the circuitry, the transitional color value of the transitional pixel at the target pixel location based on an interpolation according to the first color value and the second color value; and
generating, by the circuitry, the transitional video frame according to pixel values of a plurality of transitional pixels, the plurality of transitional pixels including the transitional pixel.

8. The method according to claim 7, wherein the generating the transitional video frame comprises:
performing, by the circuitry, differential calculation between color channel components in the first color value and color channel components in the second color value, to obtain component differences of the color channel components;
obtaining, by the circuitry, change amounts of the color channel components according to a number of transitional video frames that need to be generated; and
obtaining, by the circuitry, the transitional color value of the transitional pixel of the target pixel location of each of the number of transitional video frames according to the color channel components of the first color value, the number of the transitional video frames that need to be generated, and the change amounts of the color channel components.

9. The method according to claim 7, wherein the generating comprises:
generating the transitional video frame based on all pixels of the first video frame portion and all pixels of the second video frame portion.

10. The method according to claim 5, wherein the performing comprises:
detecting, by the circuitry, a motion direction;
selecting, by the circuitry, an initial video frame group associated with the motion direction, to obtain a target initial video frame group; and
performing, by the circuitry, the display control of the video according to the target initial video frame group.

11. The method according to claim 10, wherein the performing comprises:
obtaining, by the circuitry, a visual field angle parameter of the terminal;
determining, by the circuitry according to the visual field angle parameter, a pixel range to be displayed;
performing, by the circuitry, pixel coordinate matching on each video frame portion in the target initial video frame group according to the pixel range, to form a transitional play video frame and a second play video frame; and
sequentially playing, by the terminal, the transitional play video frame and the second play video frame.

12. A computer device, comprising:
circuitry configured to
  determine a second video frame portion associated with a second time point that is after a first time point associated with a first video frame portion of a video;
  generate a transitional video frame based on differences between first color values of pixels in the first video frame portion and second color values of pixels in the second video frame portion, a transitional color value of a pixel at a target pixel location in the transitional video frame being within a target color interval, and the target color interval being determined according to a first color value of the first color values that corresponds to the pixel at the target pixel location in the first video frame portion and a second color value of the second color values that corresponds to the pixel at the target pixel location in the second video frame portion; and
  perform display control of the video according to the transitional video frame
wherein the first color value that corresponds to the pixel at the target pixel location in the first video frame portion is one of black and white, and the second color value that corresponds to the pixel at the target pixel location in the second video frame portion is the other one of black and white.

13. The computer device according to claim 12, wherein the circuitry is configured to
  obtain motion speed information;
  obtain second pose information of the second time point according to first pose information of the first time point, the motion speed information, and a difference between the first time point and the second time point;
  obtain a second video frame of the video to be displayed at the second time point; and
  obtain the second video frame portion from the second video frame according to the second pose information.

14. The computer device according to claim 13, wherein
  a width of the second video frame portion obtained from the second video frame is greater than a width of a video image that is displayed; and
  the displayed video image is a partial image of the second video frame.

15. The computer device according to claim 14, wherein a height of the second video frame portion obtained from the second video frame is greater than a height of the displayed video image.

16. The computer device according to claim 13, wherein
  the motion speed information indicates rotation angular velocity values in at least two different motion directions,
  the second pose information is visual field orientation angle information, and
  a plurality of different motion directions is associated with initial video frame groups, and each initial video frame group includes a candidate second video frame portion and a candidate transitional video frame generated based on the second video frame portion.

17. The computer device according to claim 12, wherein the circuitry is configured to
  obtain a video frame refresh frequency of the computer device;
  obtain a video frame play frequency during playing of the video;
  determine a number of transitional video frames according to the video frame refresh frequency and the video frame play frequency; and
  generate the determined number of transitional video frames.

18. The computer device according to claim 12, wherein the circuitry is configured to
  obtain the first color value of the pixel of the target pixel location in the first video frame portion;
  obtain the second color value of the pixel of the target pixel location in the second video frame portion;
  obtain the transitional color value of the transitional pixel at the target pixel location based on an interpolation according to the first color value and the second color value; and
  generate the transitional video frame according to pixel values of a plurality of transitional pixels, the plurality of transitional pixels including the transitional pixel.

19. At least one non-transitory computer-readable storage medium storing instructions which when executed by one or more processors cause the one or more processors to perform:
  determining a second video frame portion associated with a second time point that is after a first time point associated with a first video frame portion of a video;
  generating a transitional video frame based on differences between first color values of pixels in the first video frame portion and second color values of pixels in the second video frame portion, a transitional color value of a pixel at a target pixel location in the transitional video frame being within a target color interval, and the target color interval being determined according to a first color value of the first color values that corresponds to the pixel at the target pixel location in the first video frame portion and a second color value of the second color values that corresponds to the pixel at the target pixel location in the second video frame portion; and
  performing display control of the video according to the transitional video frame,
wherein the first color value that corresponds to the pixel at the target pixel location in the first video frame portion is one of black and white, and the second color value that corresponds to the pixel at the target pixel location in the second video frame portion is the other one of black and white.

20. The method according to claim 1, wherein
  the video is a virtual reality video, and
  the first video frame portion and the second video frame portion correspond to different viewpoints within the virtual reality video.

* * * * *